US012509295B2

(12) United States Patent
Lee

(10) Patent No.: US 12,509,295 B2
(45) Date of Patent: Dec. 30, 2025

(54) APPARATUS FOR STORING CONTAINER IN MULTIPLE STAGES AND FACILITY FOR TRANSPORTING SUBSTRATE

(71) Applicant: SEMES CO., LTD., Chungcheongnam-do (KR)

(72) Inventor: Sung Ho Lee, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 481 days.

(21) Appl. No.: 18/102,649

(22) Filed: Jan. 27, 2023

(65) Prior Publication Data

US 2023/0365331 A1 Nov. 16, 2023

(30) Foreign Application Priority Data

May 10, 2022 (KR) ........................ 10-2022-0056956

(51) Int. Cl.
*B65G 1/04* (2006.01)
*B65G 1/12* (2006.01)

(52) U.S. Cl.
CPC ......... *B65G 1/0435* (2013.01); *B65G 1/0457* (2013.01); *B65G 1/12* (2013.01); *B65G 2201/0297* (2013.01); *B65G 2203/042* (2013.01)

(58) Field of Classification Search
CPC ...... B65G 1/12; B65G 1/0435; B65G 1/0457; B65G 2201/0297; B65G 2203/042; H01L 21/67727; H01L 21/67769; H01L 21/67733
See application file for complete search history.

(56) References Cited

U.S. PATENT DOCUMENTS

| | | | | |
|---|---|---|---|---|
| 3,750,804 | A * | 8/1973 | Lemelson | G07F 11/1657 414/280 |
| 2019/0164795 | A1 | 5/2019 | Motoori | |
| 2021/0331866 | A1* | 10/2021 | Morimoto | H01L 21/67769 |
| 2022/0267093 | A1* | 8/2022 | Takahara | H01L 21/67769 |
| 2022/0306382 | A1* | 9/2022 | Qin | H01L 21/67736 |
| 2023/0052015 | A1* | 2/2023 | Lee | H01L 21/67733 |

FOREIGN PATENT DOCUMENTS

| | | |
|---|---|---|
| KR | 10-2008-0072817 | 8/2008 |
| KR | 10-1674454 | 11/2016 |
| KR | 10-2020-0063659 A | 6/2020 |
| KR | 10-2020-0128179 | 11/2020 |
| KR | 10-2021-0133160 A | 11/2021 |
| KR | 10-2022-0026360 A | 3/2022 |
| KR | 10-2022-0057738 A | 5/2022 |

OTHER PUBLICATIONS

Office action from the corresponding Korean Patent Application No. 10-2022-0056956 dated Mar. 22, 2024 with its English translation from Global Dossier.

* cited by examiner

*Primary Examiner* — Glenn F Myers
(74) *Attorney, Agent, or Firm* — WOMBLE BOND DICKINSON (US) LLP

(57) ABSTRACT

An apparatus for storing a container in multiple stages includes a side track buffer including a plurality of plates forming a plurality of layers so that a plurality of containers are seated thereon; and a driving unit reciprocating at least one upper plate among the plurality of plates in a lateral direction.

17 Claims, 14 Drawing Sheets

APPARATUS FOR STORING CONTAINER IN MULTIPLE STAGES AND FACILITY FOR TRANSPORTING SUBSTRATE

CROSS-REFERENCE TO RELATED APPLICATION(S)

This application claims the benefit under 35 USC 119(a) of Korean Patent Application No. 10-2022-0056956 filed on May 10, 2022 in the Korean Intellectual Property Office, the entire disclosure of which is incorporated herein by reference for all purposes.

BACKGROUND

The present disclosure relates to an apparatus for storing a container in multiple stages and a facility for transporting a substrate.

A semiconductor (or a display) manufacturing process is a process for manufacturing a semiconductor device on a substrate (e.g., a wafer), and includes, for example, exposure, deposition, etching, ion implantation and cleaning processes, or the like. Additionally, inspection and packaging of each semiconductor device formed on the substrate may be performed. One or more floors of a manufacturing plant for manufacturing semiconductor devices are composed of clean rooms, and manufacturing facilities for performing semiconductor manufacturing processes are disposed on each floor.

In order to maximize efficiency of a semiconductor manufacturing process, a method for improving each semiconductor manufacturing process as well as a technique for quickly and efficiently transporting an article (e.g., a substrate) between manufacturing facilities has been introduced. Representatively, an overhead hoist transport (OHT) system for transporting the article along a path installed on a ceiling of a semiconductor manufacturing plant is being applied. In general, the OHT system includes a rail constituting a travelling path and a vehicle travelling along the rail and transporting an article. In addition, when it is necessary to store an article during transportation between semiconductor manufacturing facilities, a storage system for storing the article may be provided.

As an example of the storage system, a stocker in a form of a warehouse for storing an article may be provided, and a buffer installed on a side surface or below the rail and storing a container for a relatively short time may be provided. A buffer disposed on the side surface of the rail may be referred to as a side track buffer (STB), and a buffer disposed below the rail may be referred to as an under track buffer (UTB). In order to maximize the efficiency of the semiconductor manufacturing process, a system for efficiently storing many articles is required.

(Patent Document 1) Republic of Korea Patent Publication No. 10-2020-0128179

SUMMARY

The present invention has been devised to solve the above problems, and an aspect of the present disclosure is to provide apparatus for storing a container in multiple stages and a facility for transporting a substrate capable of storing a large number of containers in which substrates are accommodated.

In order to achieve the above-described object, according to an aspect of the present disclosure, an apparatus for storing a container in multiple stages includes a side track buffer including a plurality of plates forming a plurality of layers so that a plurality of containers may be seated thereon; and a driving unit reciprocating at least one upper plate among the plurality of plates in a lateral direction.

Here, the driving unit may include: a first driving member for moving the upper plate in a lateral direction; and a second driving member for returning a position of the upper plate, moved in the lateral direction to an original state thereof.

In this case, the first driving member may be a transmission shaft for push.

In addition, the first driving member may be installed in an overhead hoist transport for transporting the container.

The second driving member may be a tension spring.

In this case, the second driving member may be installed in the side track buffer and connected to the upper plate.

As another embodiment, the driving unit may include a reciprocating driving cylinder installed in the side track buffer and connected to the upper plate to reciprocate the upper plate in a lateral direction.

Meanwhile, the side track buffer may further include a support member on which the upper plate is seated and disposed in a lateral direction to guide lateral reciprocating movement of the upper plate.

In this case, the support member may include two bars supporting both edges of the upper plate, and a passage space through which the container passes in a longitudinal direction may be formed between the two bars.

Meanwhile, in the present disclosure, a bogie detection sensor installed in the side track buffer and detecting that an overhead hoist transport (OHT) for transporting the container is approaching may be further included.

In addition, in the present disclosure, a container detection sensor installed in the side track buffer and detecting that the container is stored in a lower plate among the plurality of plates, may be further included.

In addition, in the present disclosure, a control unit electrically connected to the bogie detection sensor, the container detection sensor, and the driving unit, and when non-storage of the container is detected by the container detection sensor and proximity of the overhead hoist transport (OHT) is detected by the bogie detection sensor, operating and controlling the driving unit to move the upper plate in a lateral direction, may be further included.

Meanwhile, according to another aspect of the present disclosure, an apparatus for storing a container in multiple stages may be provided, the apparatus for storing a container in multiple stages includes: a side track buffer including a plurality of plates forming a plurality of layers so that a plurality of containers are seated thereon; and a driving unit reciprocating an upper plate among the plurality of plates in a lateral direction, wherein, the side track buffer includes: a frame installed on a ceiling and disposed in a longitudinal direction; a plurality of plates disposed on the frame to be spaced apart from each other in a longitudinal direction; and a support member on which the upper plate is seated and installed in the frame in a lateral direction to guide lateral reciprocating movement of the upper plate.

A facility for transporting a substrate is provided, the facility for transporting a substrate including: a ceiling rail installed on a ceiling; an overhead hoist transport (OHT) installed on the ceiling rail and moving along the ceiling rail; a side track buffer installed on the ceiling, disposed on both sides of the ceiling rail, and including a plurality of plates forming a plurality of layers on which a plurality of containers are seated; and a driving unit reciprocating at least one upper plate among the plurality of plates in a lateral direction, wherein the driving unit includes a first driving member installed on the overhead hoist transport, and moving the upper plate in a lateral direction; and a second driving member installed in the side track buffer, and returning a position of the upper plate moved in the lateral direction, to an original state thereof.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "including", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof. Hereinafter, exemplary embodiments will be described with reference to various examples. However, embodiments of the present disclosure may be modified in various other forms, and the scope of the present disclosure is not limited to the embodiments described below.

A semiconductor or display manufacturing plant is composed of one or more clean rooms, and manufacturing facilities for performing a semiconductor manufacturing process may be installed in each clean room. In general, a plurality of manufacturing processes may be repeatedly performed on a substrate (e.g., a wafer) so that a finally processed substrate may be completed. When a manufacturing process is completed in a specific semiconductor manufacturing facility, the substrate is transported) to a facility for the next manufacturing process. Here, the substrate may be transported while being stored in a container (as an example, a Front Opening Unified Pod, FOUP) capable of accommodating a plurality of substrates. The container containing the substrates may be transported by a transport vehicle (e.g., overhead hoist transport, OHT).

Figure 1:
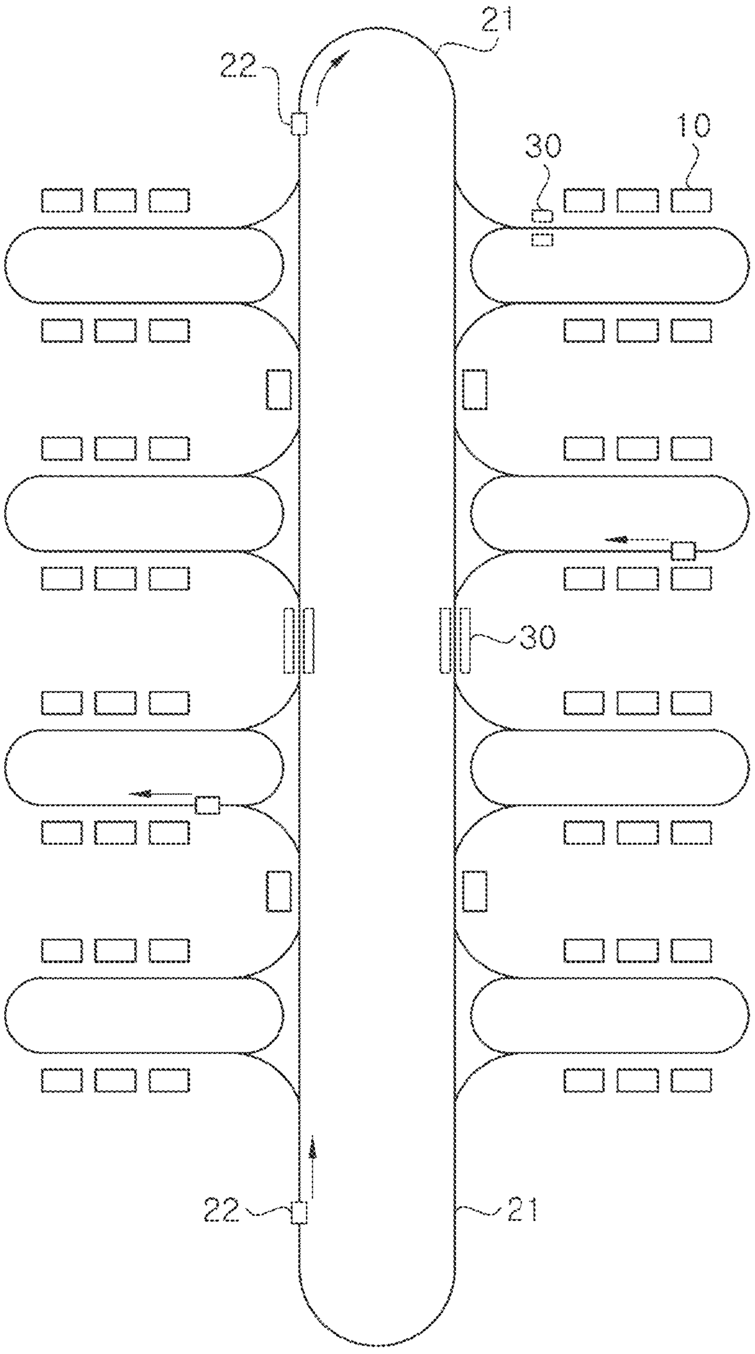
FIG. 1 is a view illustrating a transport path of a container in a semiconductor or display manufacturing plant.

FIG. 1 is a view illustrating a transport path of a container in a semiconductor or display manufacturing plant.

Referring to FIG. 1, a semiconductor or display manufacturing plant has a plurality of manufacturing facilities 10 for performing processes therein. In addition, in the manufacturing plant, a ceiling rail 21 forming a transport path of containers between a plurality of manufacturing facilities 10, and an overhead hoist transport 22 transporting containers to the manufacturing facility 10 while travelling the ceiling rail 21 may be provided. Here, when the overhead hoist transport 22 transports the container between the plurality of manufacturing facilities 10, the container may be directly transported from a specific manufacturing facility to other manufacturing facilities, or the container may be stored in a storage device 30, and then be transported to other manufacturing facilities. The storage device 30 may be installed in a position, adjacent to the ceiling rail 21, which is a transport path. The storage device 30 may be a rack-type warehouse (stocker) capable of injecting an inert gas in order to maintain a clean environment in the container. In addition, the storage device 30 may be a side track buffer (STB) disposed on both sides of the ceiling rail 21 to store containers or an under trap buffer (STB) disposed below the ceiling rail 21 to store containers.

Figure 2:
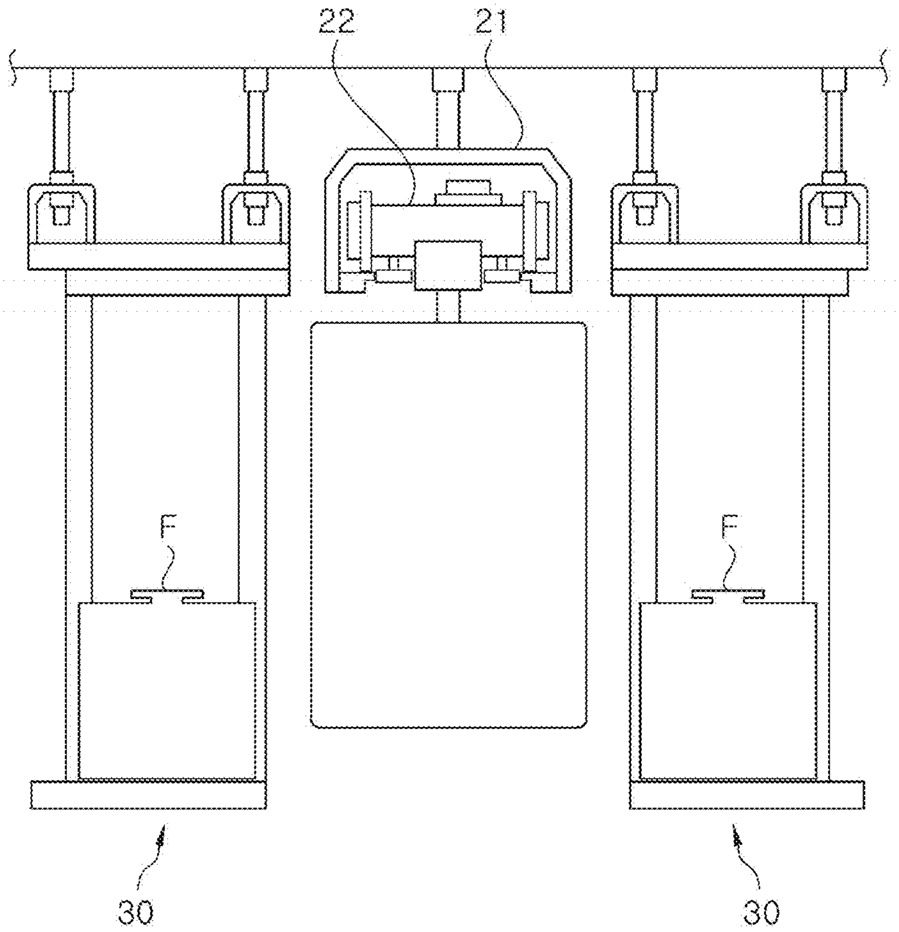
FIG. 2 is a view illustrating an apparatus for storing a container according to the prior art disposed in the apparatus for storing a container.

FIG. 2 is a view illustrating an apparatus for storing a container according to the prior art disposed in the transport path of the container of FIG. 1.

Referring to FIG. 2, a side track buffer, which is a storage device 30, may be disposed on both sides of the ceiling rail 21 on which the overhead hoist transport 22 travels. However, in this side track buffer, a storage layer in which the container F is stored is a single layer. Accordingly, since only one container F may be stored on each side, there is an inefficient limitation in terms of the storage capacity of the container F.

Figure 3:
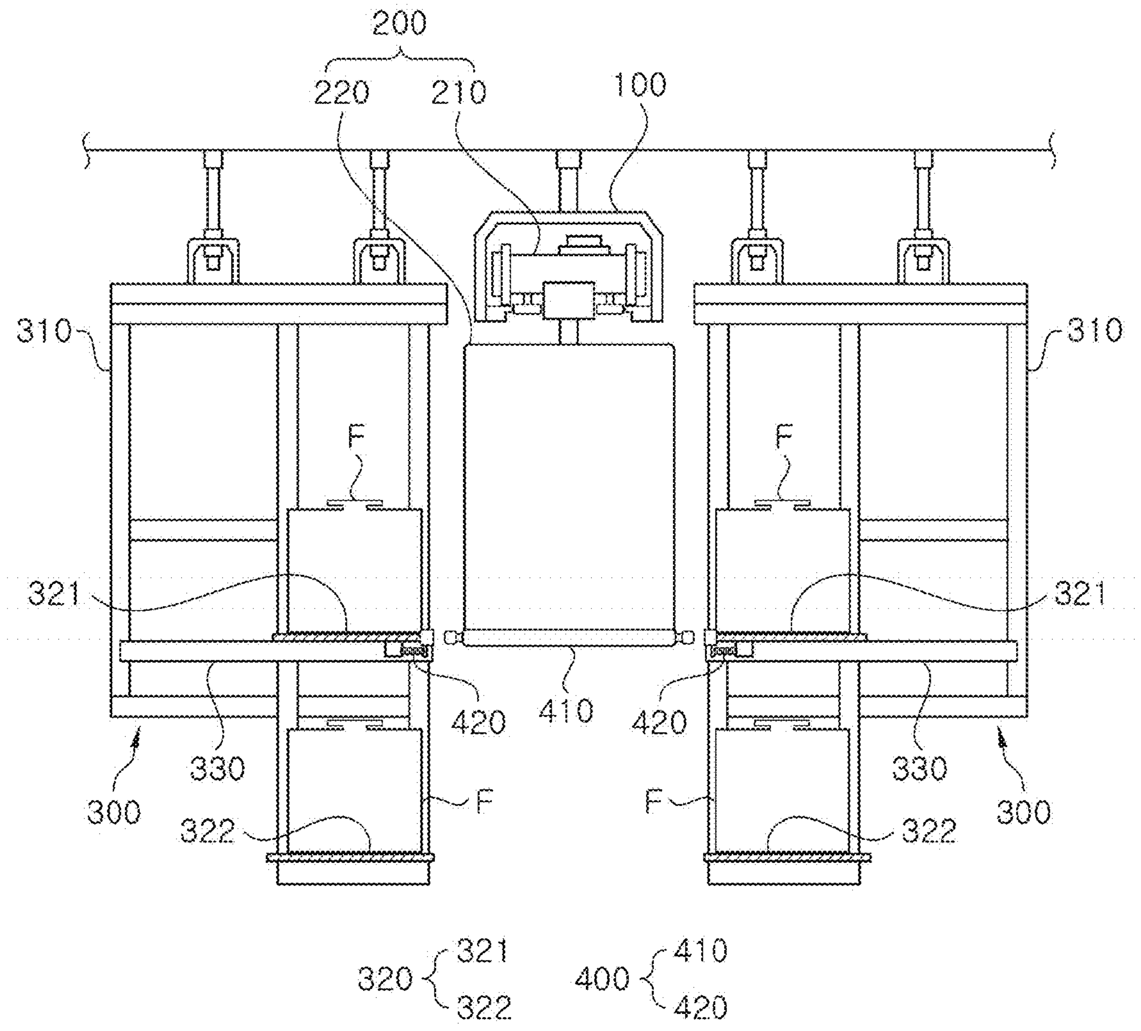
FIG. 3 is a view illustrating an apparatus for storing a container in multiple stages according to a first embodiment of the present disclosure.
Figure 4:
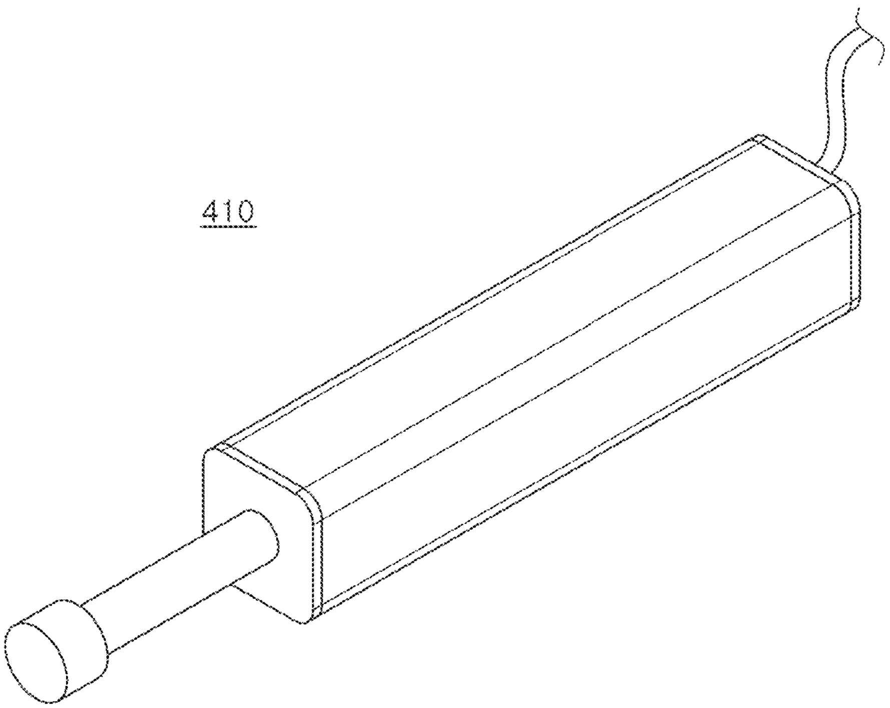
FIG. 4 is a view illustrating a transmission shaft for push of the apparatus for storing a container in multiple stages of FIG. 3.
Figure 5:
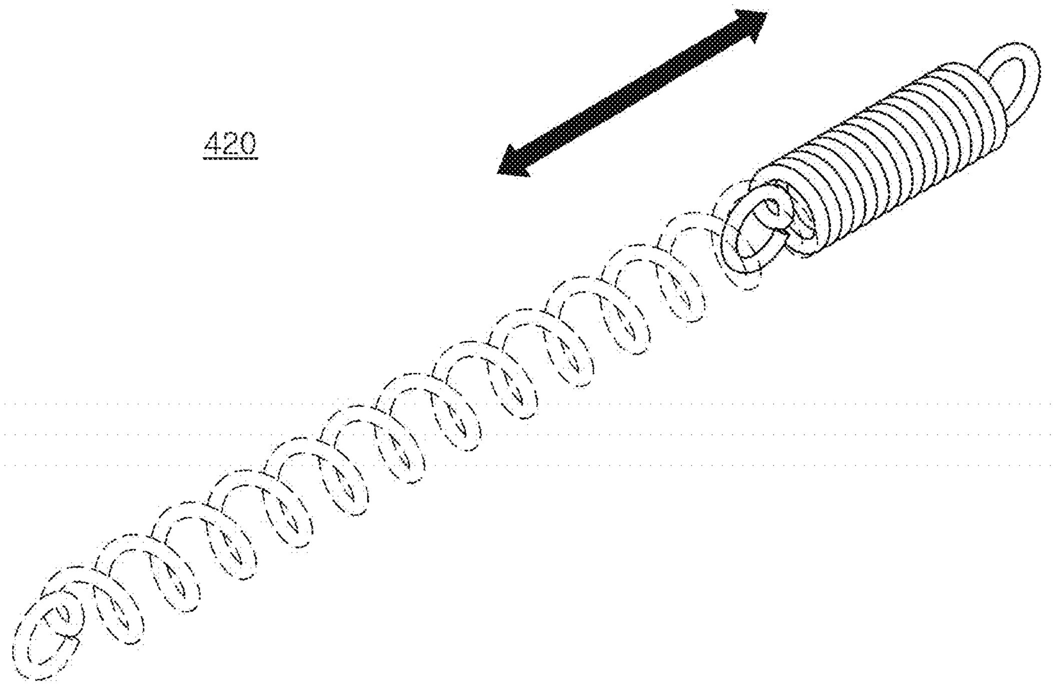
FIG. 5 is a view illustrating a tension spring of the apparatus for storing a container in multiple stages of FIG. 3.

FIG. 3 is a view illustrating an apparatus for storing a container in multiple stages according to a first embodiment of the present disclosure, FIG. 4 is a view illustrating a transmission shaft for push of the apparatus for storing a container in multiple stages of FIG. 3, and FIG. 5 is a view illustrating a tensile spring of the apparatus for storing a container in multiple stages of FIG. 3.

Referring to the drawings, a facility for transporting a substrate according to the present disclosure includes a ceiling rail 100, an overhead hoist transport 200, a side track buffer 300, and a driving unit 400.

The ceiling rail 100 is installed on a ceiling and forms a transport path for transporting a container F between a plurality of manufacturing facilities.

The overhead hoist transport 200 transports a container F such as a FOUP while traveling on the ceiling rail 100 and transports the same to a manufacturing facility. Such an overhead vehicle 200 is known as an overhead hoist transport (OHT), an overhead hoist vehicle (OHV), or the like.

Specifically, the overhead hoist transport 200 includes a traveling bogie 210 and a container receiving body 220.

The traveling bogie 210 has wheels supported by the ceiling rail 100 and travels along the ceiling rail 100. The container receiving body 220 will be described later with reference to FIGS. 8 to 10.

The side track buffer (STB) 300 includes a frame 310, a plate 320, and a support member 330.

The frame 310 is installed on the ceiling and is disposed in a longitudinal direction.

The plate 320 is installed on the frame 310. The plurality of plates 320 are disposed to be spaced apart in a longitudinal direction to form a plurality of layers. The plurality of plates 320 forming a plurality of layers in this manner may store a plurality of containers F. In this case, the plurality of layers means two or more layers, and may be specifically implemented by disposing two or more plates 320 spaced apart from each other in the longitudinal direction. Among the plurality of plates 320, an upper plate 321 means a plate disposed upwardly of the other plates 320 as a relative concept. A lower plate 322 among the plurality of plates 320 also means a plate disposed downwardly of the other plates 320 as a relative concept.

Figure 7:
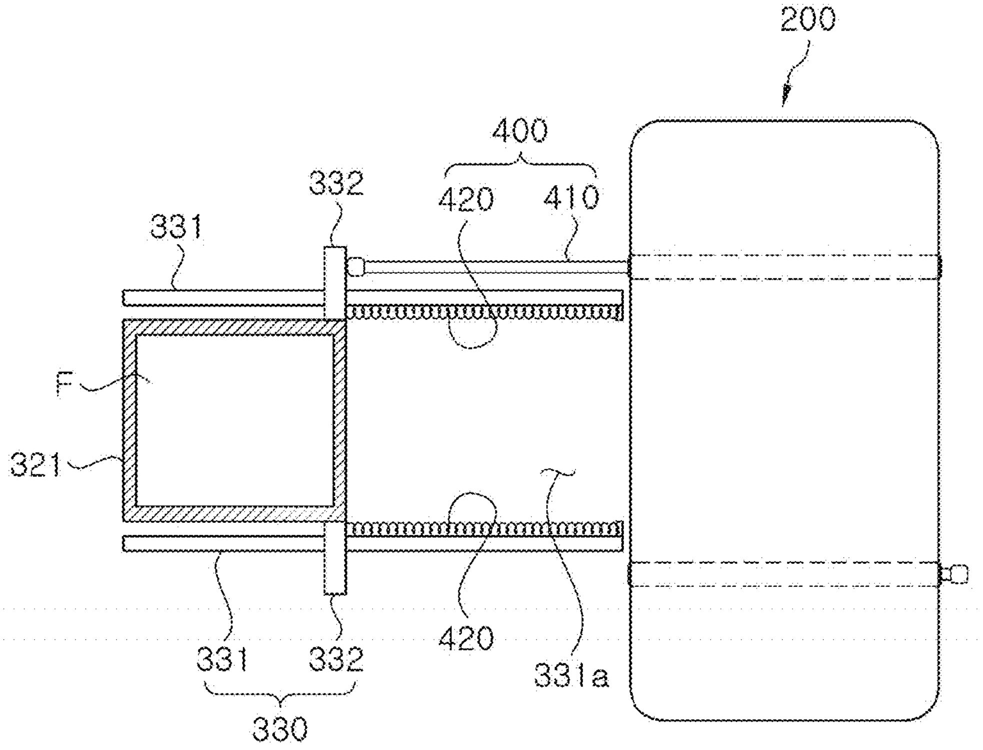

The support member 330 has the upper plate 321 seated thereon, and is installed in the frame 310 in the lateral direction to guide lateral reciprocating movement of the upper plate 321. Specifically, as illustrated in FIG. 7, the support member 330 may include two bars 331 supporting both edges of the upper plate 321. A passage space 331*a* through which the container F passes in the longitudinal direction may be formed between the two bars 331. The support member 330 may further include a moving bracket 332. The moving bracket 332 is installed on the bar 331 and has the upper plate 321 seated and fixed thereto. The moving bracket 332 is a member contacted by a first driving member 410 and moved when the first driving member 410 operates. The moving bracket 332 is slidably installed on the bar 331 and slidably moves in the lateral direction when push force is received by the first driving member 410. In addition, the moving bracket 332 is connected to a second driving member 420. When the push force of the first driving member 410 is released, the moving bracket 332 is pulled by tensile force of the second driving member 420 and slidably moves to an original position thereof.

The driving unit 400 reciprocates at least one upper plate 321 among the plurality of plates 320 in a lateral direction. In the drawings, the plurality of plates 320 form a structure having two layers, but the present disclosure is not limited thereto and in the structure may have three or more layers. In this case, the plurality of upper plates disposed above the lowermost plate may be reciprocated in the lateral direction by a driving unit.

Specifically, the driving unit 400 may include a first driving member 410 and a second driving member 420.

The first driving member 410 moves the upper plate 321 in a lateral direction. The first driving member 410 may be, for example, a transmission shaft for push. The transmission shaft for push is a member configured to push the container F and is operated by electricity. An electric cylinder may be used as the transmission shaft for push. The transmission shaft for push may push the upper plate 321 in the lateral direction by extending movement rod externally during the operation. In this case, the lateral direction is a direction away from the overhead hoist transport 200, and means a direction in which the container F moves away from a vertical route, toward the lower plate 322. The first driving member 410 may be installed in an overhead hoist transport 200 for transporting the container F. The first driving member 410 may be installed at a lower end of the overhead hoist transport 200 corresponding to the upper plate 321 in height.

The second driving member 420 returns a position of the upper plate 321 moved in the lateral direction. The second driving member 420 may be installed in the side track buffer 300 and connected to the upper plate 321. The second driving member 420 may be, for example, a tension spring. The tension spring is a member returning the upper plate 321 to an original position thereof and generates tensile force with respect to the container F through elastic force thereof. When the upper plate 321 is moved in the lateral direction by pushing the upper plate 321 while being extended by the operation of the first driving member 410, the tension spring connected to the upper plate 321 is stretched. Thereafter, when the push force to the upper plate 321 is released as the first driving member 410 is contracted by the operation thereof, the tension spring pulls the upper plate 321 with tensile force by elasticity. Accordingly, the position of the upper plate 321 is returned to an original position thereof by the second driving member 420.

FIGS. 6 to 12 are diagrams illustrating a process of storing containers in multiple stages in the side track buffer on the left side in the apparatus for storing a container in multiple stages.

Figure 9:
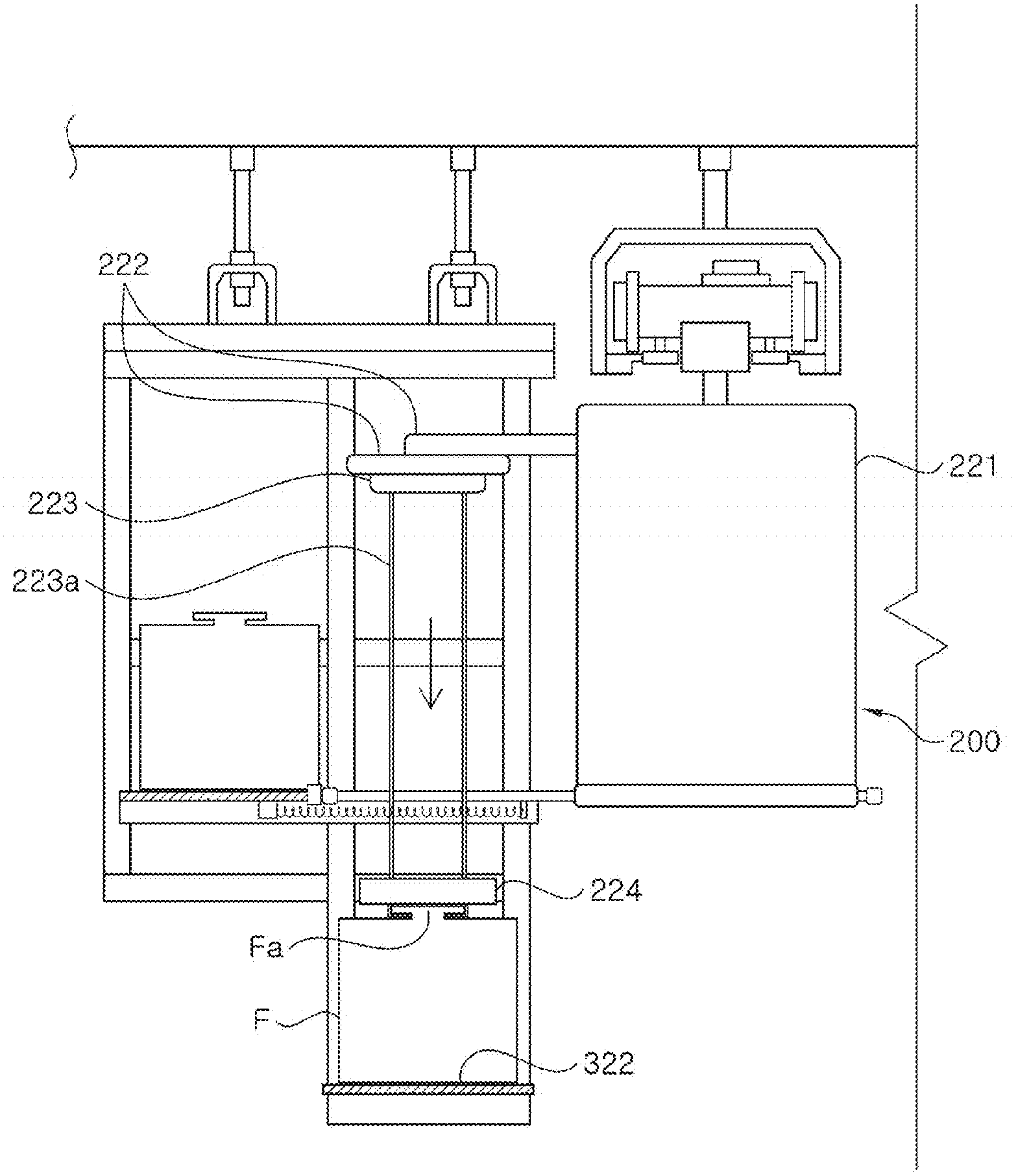
Figure 10:
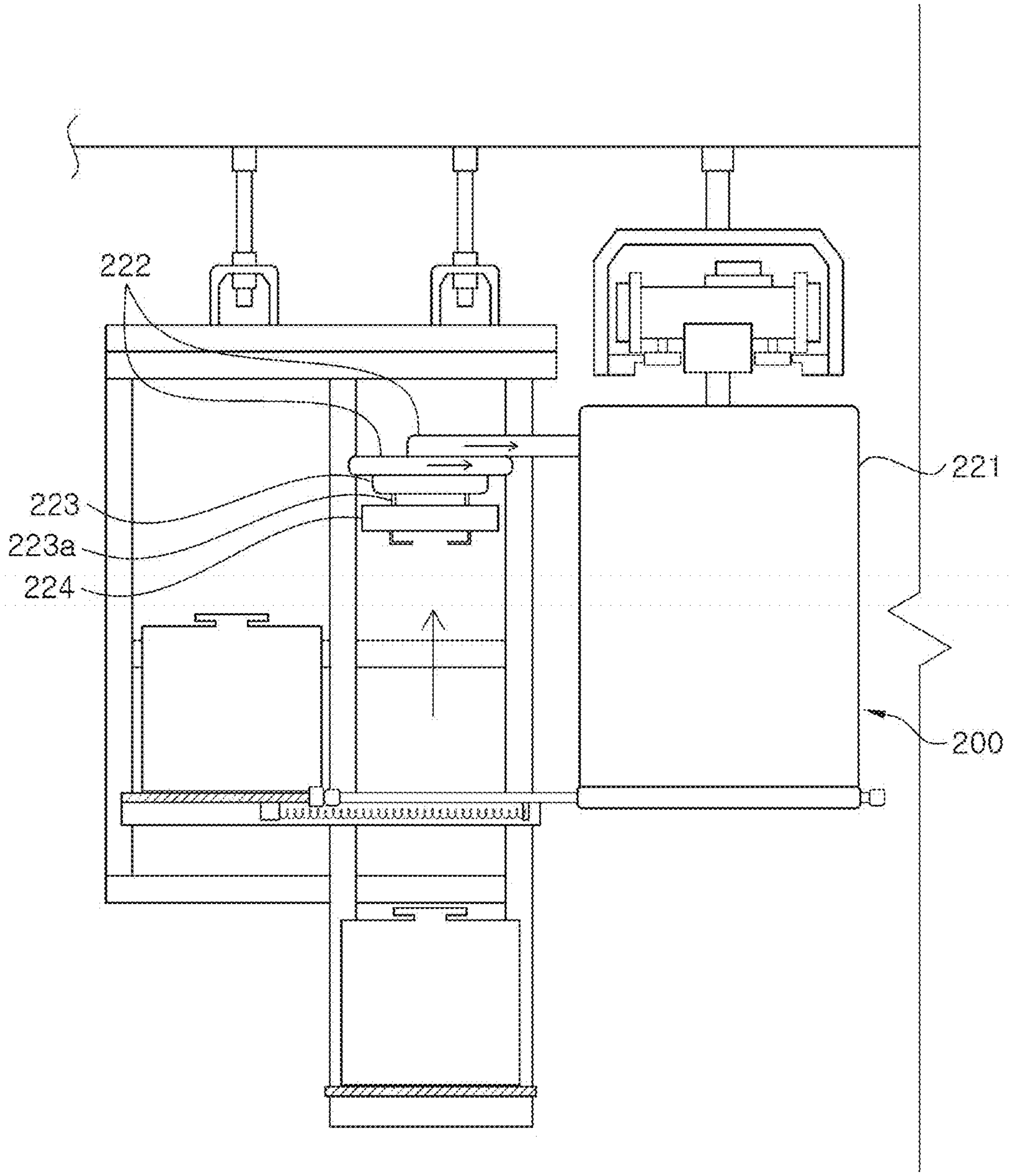

Before the process of storing a container is described, a container receiving body 220 of the overhead hoist transport 200 will be described with reference to FIGS. 8 to 10.

The container accommodating body 220 is connected to a lower portion of a traveling bogie 210 and is configured so that a container F is accommodated therein with a structure in which both side portions and a lower portion are open. The container receiving body 220 includes a housing 221, a sliding portion 222, a lifting portion 223, and a grip portion 224. The housing 221 has both side portions and a lower portion, open, and an accommodating space in which the container F is accommodated is formed thereinside. The slide portion 222 is installed above the inside of the housing 221 and has a structure slidably moving reciprocally in the lateral direction through both open side portions of the housing 221. The lifting portion 223 is installed on the slide portion 222 and has a lifting belt 223*a* that is unwound and wound in a longitudinal direction. The grip portion 224 is a portion connected to a lower end of the lifting belt 223*a* and gripping an upper flange Fa of the container F.

Then, a process of storing the container F in multiple stages in the side track buffer 300 disposed on a left side is as follows.

Figure 6:
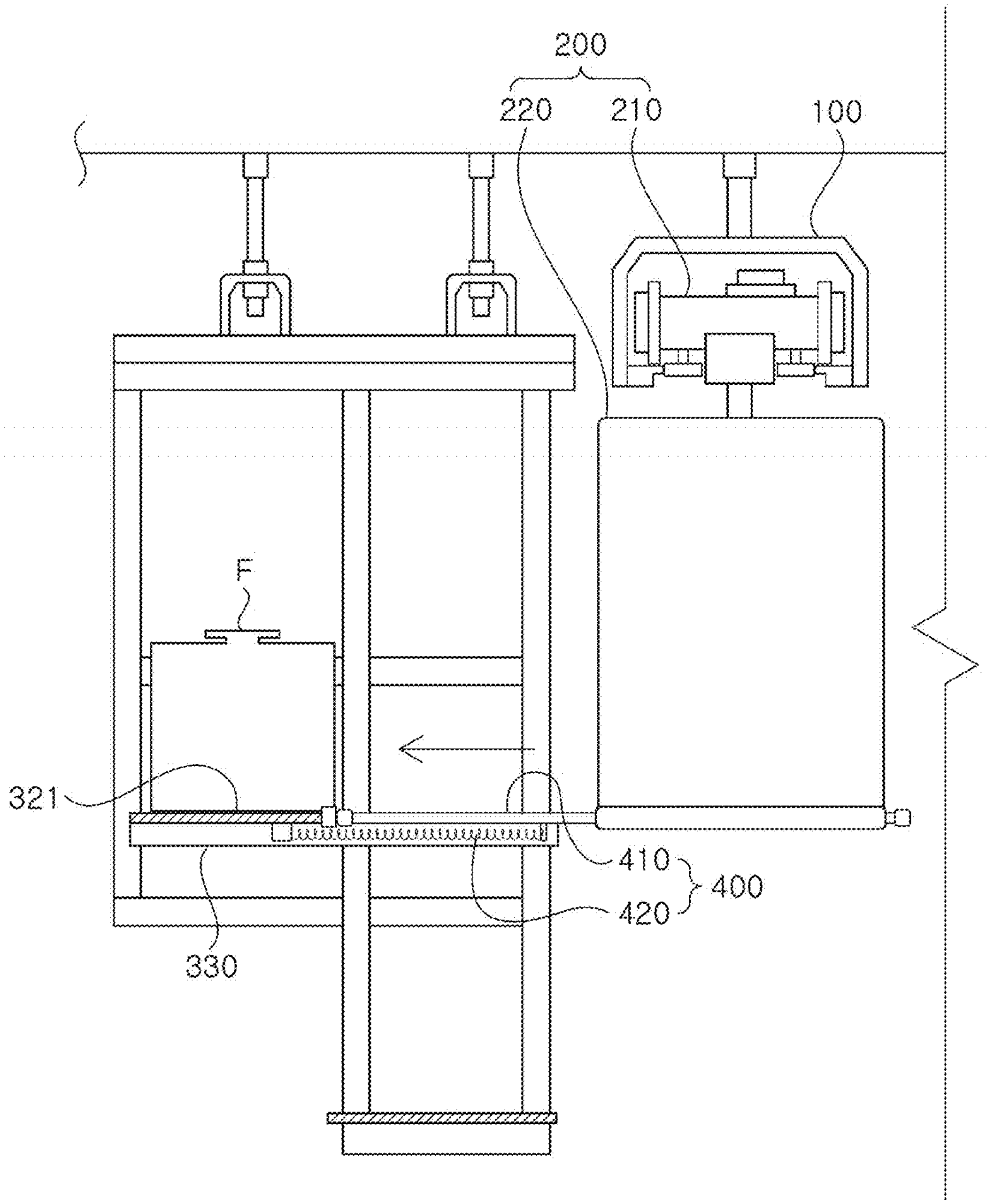
FIGS. 6 to 12 are diagrams illustrating a process of storing a container in multiple stages in a side track buffer on a left side in the apparatus for storing a container in multiple stages of FIG. 3.

First, as illustrated in FIGS. 6 and 7, the first driving member 410, which is a transmission shaft for push installed in the overhead hoist transport 200, is operated and extended to push an upper plate 321 and move the same in the lateral direction. Specifically, the first driving member 410 moves the upper plate 321 by pushing the bracket on which the upper plate 321 is seated, to slide a moving bracket 332 along the bar 331.

Figure 8:
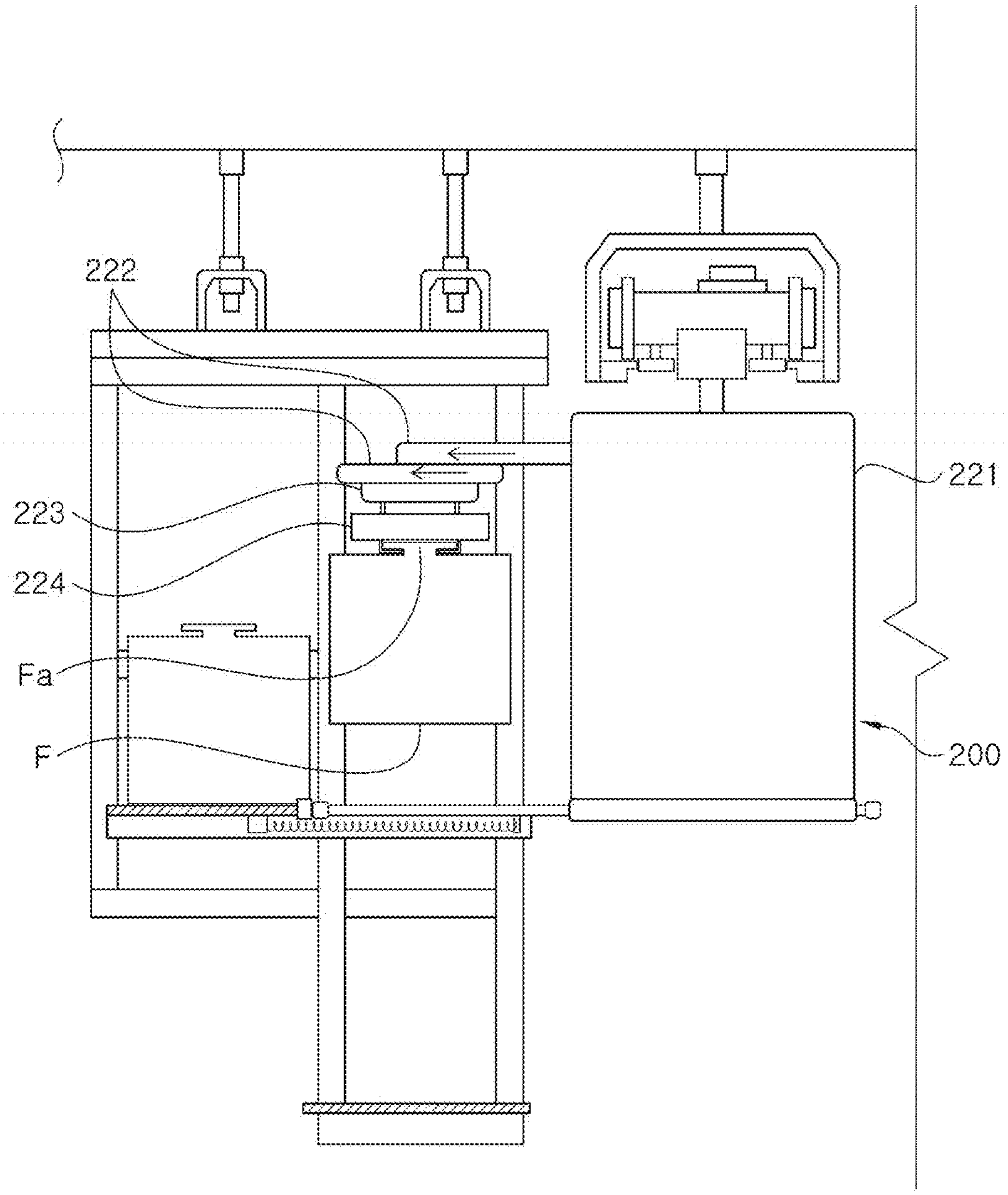

Thereafter, as illustrated in FIG. 8, the slide portion 222 of the container receiving body 220 slides leftward to take the container F out of the housing 221 of the container receiving body 220. Next, as illustrated in FIG. 9, the lifting belt 223*a* of the lifting portion 223 is unwound and the container F is lowered and seated on the lower plate 322. In this case, the grip portion 224 releases a grip of the upper flange Fa of the container F so that the container F remains seated on the lower plate 322.

Figure 11:
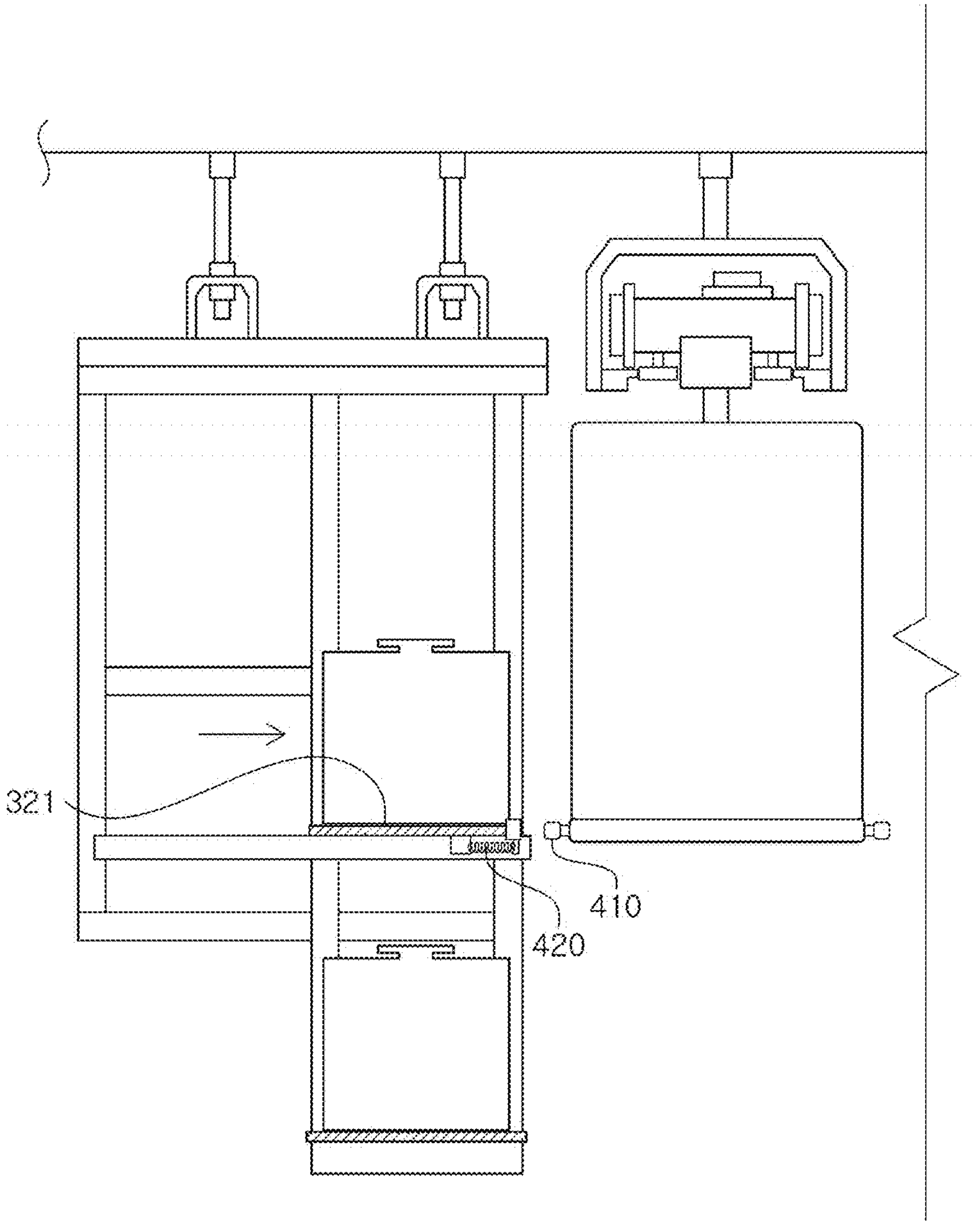
Figure 12:
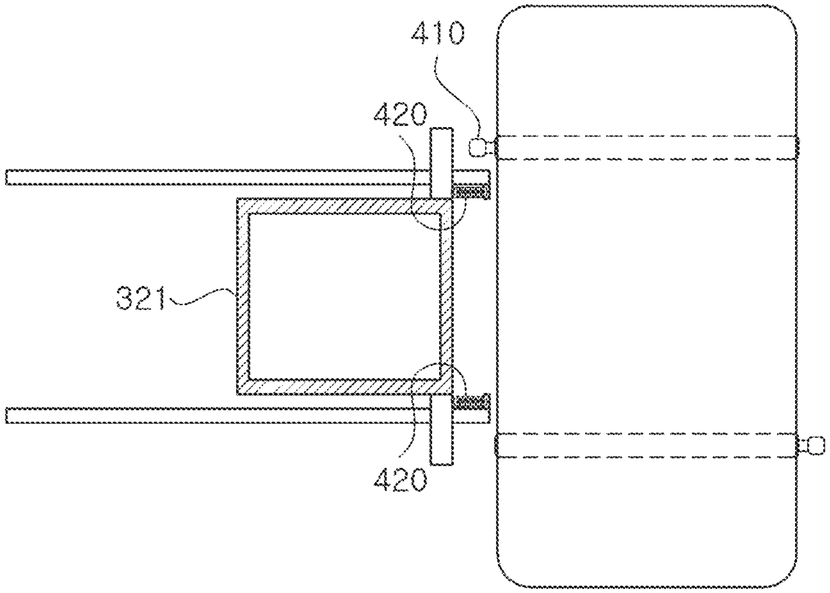

Thereafter, the process described above proceeds in reverse. That is, as illustrated in FIG. 10, the lifting belt 223*a* of the lifting part 223 is wound up and raised, and the slide portion 222 slides into the housing 221. Finally, as illustrated in FIGS. 11 and 12, when push force to the upper plate 321 is released by contraction of the first driving member 410, the second driving member 420, which is a tension spring, pulls the upper plate 321 to return the upper plate 321 to an original position thereof.

Furthermore, although not illustrated in the drawings, a container transported by other overhead hoist transports may also be stored in multiple stages in the side track buffer (300 in FIG. 3) disposed on the right side through the above-described process.

Figure 13:
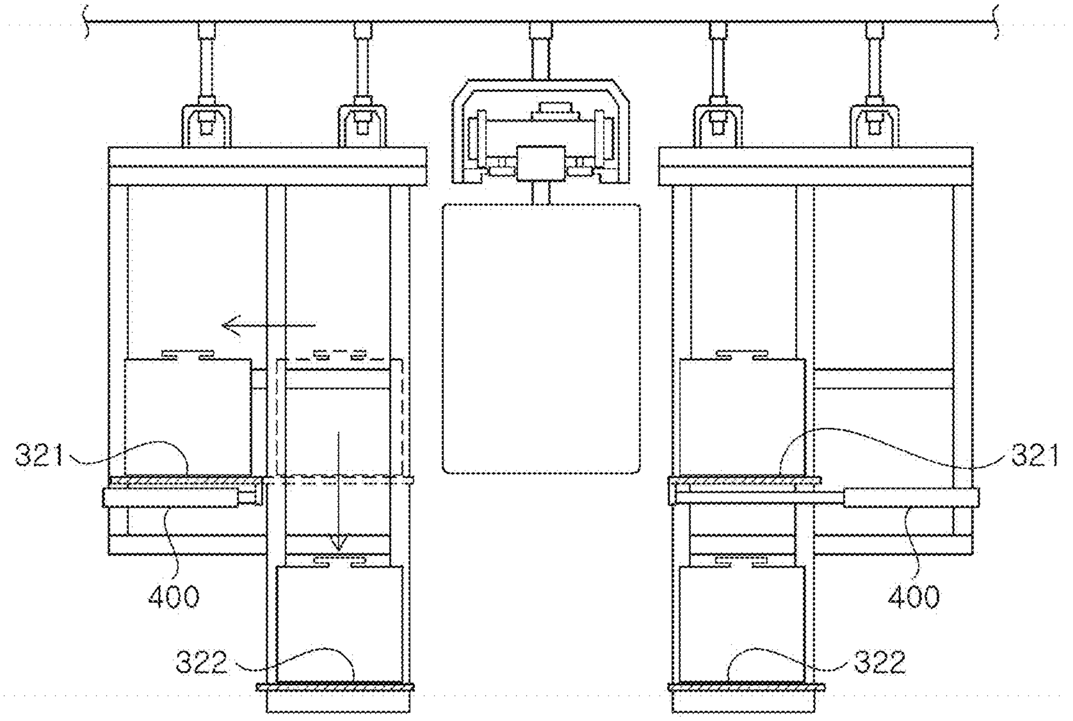
FIG. 13 is a view illustrating an apparatus for storing a container in multiple stages according to a second embodiment of the present disclosure.

FIG. 13 is a view illustrating an apparatus for storing a container in multiple stages according to a second embodiment of the present disclosure.

Referring to FIG. 13, the driving unit 400 may be a reciprocating driving cylinder. The reciprocating driving cylinder is installed in a side track buffer 300 and connected to an upper plate 321 to reciprocate the upper plate 321 in a lateral direction. As the reciprocating driving cylinder, a pneumatic reciprocating cylinder operated by air pressure or a hydraulic reciprocating cylinder operated by hydraulic pressure may be used. When a cylinder rod contracts, the reciprocating driving cylinder pulls the upper plate 321 to move the upper plate 321 from an upper side of the lower plate 322 in a lateral direction. In addition, when the cylinder rod extends, the reciprocating driving cylinder pushes the upper plate 321 to return the upper plate 321 to an original position thereof, the upper side of the lower plate 322. Such a reciprocating driving cylinder may perform both the roles of the first driving member (410 in FIG. 3) and the second driving member (420 in FIG. 3) of the first embodiment.

Figure 14:
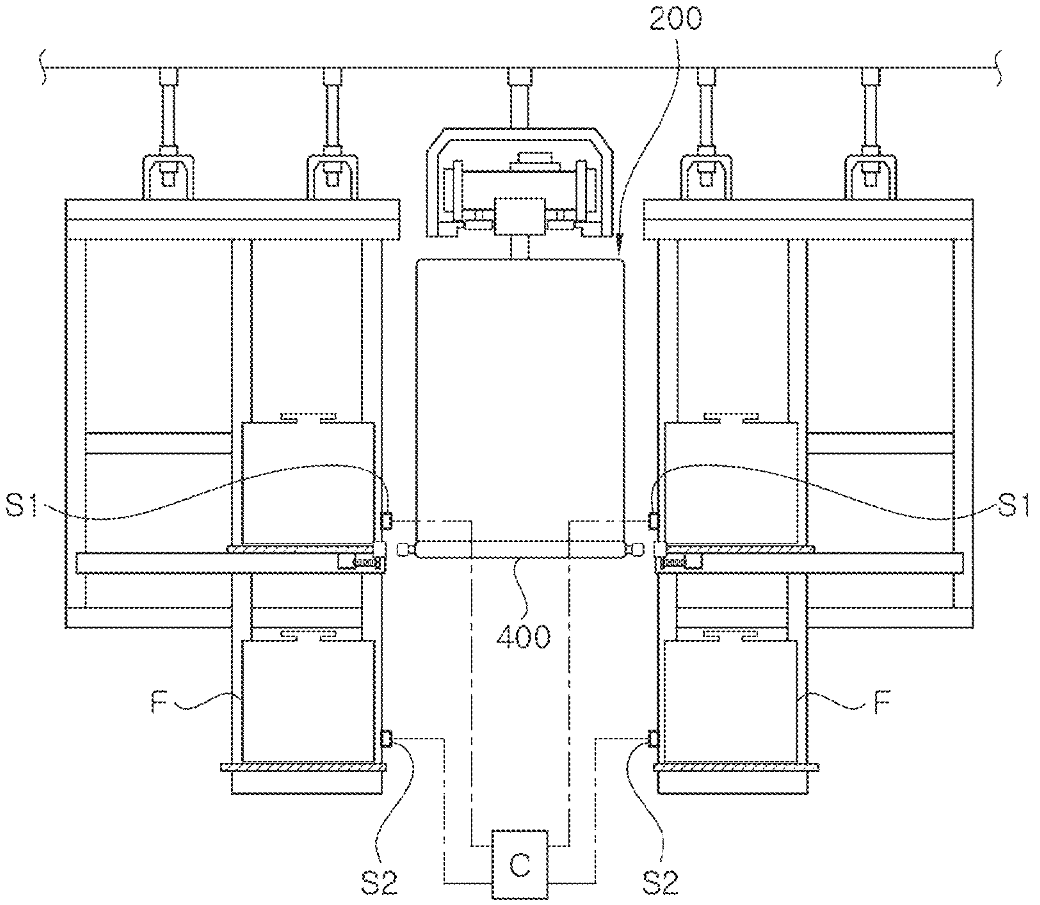
FIG. 14 is a view illustrating an apparatus for storing a container in multiple stages according to a third embodiment of the present disclosure.

FIG. 14 is a view illustrating an apparatus for storing a container in multiple stages according to a third embodiment of the present disclosure.

Referring to FIG. 14, the present disclosure may further include a bogie detection sensor S1, a container detection sensor S2, and a control unit C.

The bogie detection sensor S1 is installed in the side track buffer 300 and detects that the overhead hoist transport 200 for transporting the container F is approaching.

In addition, the container detection sensor S2 is installed in the side track buffer 300 and detects that the container F is stored in the lower plate 322 among the plurality of plates 320.

The control unit C is electrically connected to the bogie detection sensor S1, the container detection sensor S2, and the driving unit 400. The control unit C operates and controls the driving unit 400 based on a detection state by the traveling bogie detection sensor S1 and the container detection sensor S2. Specifically, when non-storage of the container F (a state in which the container F is not stored) is detected by the container detection sensor S2 and proximity of the traveling bogie of the overhead hoist transport (OHT) is detected by the bogie detection sensor S1, the control unit C operates and controls the driving unit 400 to move the upper plate 321 in a lateral direction. That is, when the overhead hoist transport (OHT) 200 is approaching in a state in which there is no container F on the lower plate 322, the control unit C operates and controls the driving unit 400 to move the upper plate 321 in the lateral direction to store the container F on the lower plate 322.

As set forth above, according to the present disclosure, since the side track buffer is composed of a plurality of layers to store containers in multiple stages, many containers may be stored.

In addition, in the present disclosure, a container may be smoothly and easily stored in multiple stages by configuring a driving unit for reciprocating an upper plate of the side track buffer.

While exemplary embodiments have been shown and described above, it will be apparent to those skilled in the art that modifications and variations could be made without departing from the scope of the present invention as defined by the appended claims.

DESCRIPTION OF REFERENCE NUMERALS

100: CEILING RAIL
200: OVERHEAD HOIST TRANSPORT
210: TRAVELLING BOGIE
220: CONTAINER RECEIVING BODY
221: HOUSING
222: SLIDING PORTION
223: LIFTING PORTION
223A: LIFTING BELT
300: SIDE TRACK BUFFER
310: FRAME
320: PLATE
321: UPPER PLATE
322: LOWER PLATE
330: SUPPORT MEMBER
331: BAR
331A: PASSAGE SPACE
332: MOVING BRACKET
400: DRIVING UNIT
410: FIRST DRIVING MEMBER
420: SECOND DRIVING MEMBER
F: CONTAINER
FA: UPPER FLANGE
S1: BOGIE DETECTION SENSOR
S2: CONTAINER DETECTION SENSOR
C: CONTROL UNIT

What is claimed is:

1. An apparatus for storing a container in multiple stages, comprising:

a side track buffer including a plurality of plates forming a plurality of layers on which a plurality of containers are seated;

a driving unit reciprocating at least one upper plate among the plurality of plates in a lateral direction;

a bogie detection sensor that is installed in the side track buffer and that is adapted to detect that an overhead hoist transport for transporting the container is approaching;

a container detection sensor that is installed in the side track buffer and that is adapted to detect that the container is stored in a lower plate among the plurality of plates; and a control unit that is electrically connected to the bogie detection sensor, the container detection sensor, and the driving unit, wherein the control unit operates and controls the driving unit to move the at least one upper plate in a lateral direction when non-storage of the container is detected by the container detection sensor and proximity of the overhead hoist transport is detected by the bogie detection sensor.

2. The apparatus of claim 1, wherein the driving unit comprises:

a first driving member for moving the at least one upper plate in the lateral direction; and a second driving member for returning a position of the at least one upper plate, moved in the lateral direction, to an original state thereof.

3. The apparatus of claim 2, wherein the first driving member is a transmission shaft for push.

4. The apparatus of claim 2, wherein the first driving member is installed in the overhead hoist transport.

5. The apparatus of claim 2, wherein the second driving member is a tension spring.

6. The apparatus of claim 2, wherein the second driving member is installed in the side track buffer and connected to the at least one upper plate.

7. The apparatus of claim 1, wherein the driving unit comprises a reciprocating driving cylinder installed in the side track buffer and connected to the at least one upper plate, and the reciprocating driving cylinder reciprocates the at least one upper plate in a lateral direction.

8. The apparatus of claim 1, wherein the side track buffer further comprises a support member on which the at least one upper plate is seated, and the support member is disposed in a lateral direction to guide lateral reciprocating movement of the at least one upper plate.

9. The apparatus of claim 8, wherein the support member comprises two bars supporting edges of the at least one upper plate, and a passage space through which the container passes in a longitudinal direction is formed between the two bars.

10. An apparatus for storing a container in multiple stages, comprising:

a side track buffer including a plurality of plates forming a plurality of layers on which a plurality of containers are seated; and a driving unit reciprocating an upper plate among the plurality of plates in a lateral direction, wherein the side track buffer comprises:

a frame that is installed on a ceiling and disposed in a longitudinal direction, wherein the plurality of plates are disposed on the frame and spaced apart from each other in the longitudinal direction; and a support member on which the upper plate is seated, the support member being installed in the frame in a lateral direction to guide lateral reciprocating movement of the upper plate, and wherein the apparatus for storing the container in multiple stages further comprises:

a bogie detection sensor that is installed in the side track buffer and that is adapted to detect that an overhead hoist transport for transporting the container is approaching;

a container detection sensor that is installed in the side track buffer and that is adapted to detect that the container is stored in a lower plate among the plurality of plates; and a control unit that is electrically connected to the bogie detection sensor, the container detection sensor, and the driving unit, wherein the control unit operates and controls the driving unit to move the upper plate in a lateral direction when non-storage of the container is detected by the container detection sensor and proximity of the overhead hoist transport is detected by the bogie detection sensor.

11. The apparatus of claim 10, wherein the driving unit comprises:

a first driving member for moving the upper plate in the lateral direction; and a second driving member for returning a position of the upper plate, moved in the lateral direction, to an original state thereof.

12. The apparatus of claim 11, wherein the first driving member is a transmission shaft for push.

13. The apparatus of claim 11, wherein the first driving member is installed in the overhead hoist transport.

14. The apparatus of claim 11, wherein the second driving member is a tension spring.

15. The apparatus of claim 11, wherein the second driving member is installed in the side track buffer.

16. The apparatus of claim 10, wherein the driving unit comprises a reciprocating driving cylinder installed in the side track buffer and the reciprocating driving cylinder reciprocates the upper plate in a lateral direction.

17. A facility for transporting a substrate, comprising:

a ceiling rail installed on a ceiling;

an overhead hoist transport installed on the ceiling rail and that moves a container among a plurality of containers along the ceiling rail;

a side track buffer installed on the ceiling and disposed on both sides of the ceiling rail, the side track buffer comprising a plurality of plates forming a plurality of layers so that the plurality of containers are seated;

a driving unit reciprocating at least one upper plate among the plurality of plates in a lateral direction, wherein the driving unit includes:

a first driving member that is installed in the overhead hoist transport and that moves the at least one upper plate in a lateral direction; and a second driving member installed in the side track buffer, and that returns a position of the at least one upper plate, moved in the lateral direction, to an original position thereof;

a bogie detection sensor that is installed in the side track buffer and that is adapted to detect that the overhead hoist transport is approaching;

a container detection sensor that is installed in the side track buffer and that is adapted to detect that the container is stored in a lower plate among the plurality of plates; and control unit that is electrically connected to the bogie detection sensor, the container detection sensor, and the driving unit, wherein the control unit operates and controls the driving unit to move the at least one upper plate in the lateral direction when non-storage of the container is detected by the container detection sensor and proximity of the overhead hoist transport is detected by the bogie detection sensor.

* * * * *